(12) United States Patent
Milbrath et al.

(10) Patent No.: US 6,308,656 B1
(45) Date of Patent: Oct. 30, 2001

(54) MODULAR TEAT CUP ASSEMBLY

(76) Inventors: Constance J. Milbrath, N7293 County Highway Y; Reed A. Larson, N. 7766 State Rd. 26, both of Watertown, WI (US) 53094

( * ) Notice: Subject to any disclaimer, the term of this patent is extended or adjusted under 35 U.S.C. 154(b) by 0 days.

(21) Appl. No.: 09/470,772

(22) Filed: Dec. 23, 1999

(51) Int. Cl.$^7$ .................................................. A01J 5/04
(52) U.S. Cl. ................................. 119/14.47; 119/14.49
(58) Field of Search .......................... 119/14.47, 14.48, 119/14.49, 14.5, 14.51, 14.52

(56) References Cited

U.S. PATENT DOCUMENTS

| | | | |
|---|---|---|---|
| 1,213,814 | * 1/1917 | Anderson | 119/14.47 |
| 2,300,833 | * 11/1942 | Scott | 119/14.51 |
| 2,997,980 | 8/1961 | Noorlander | 119/14.52 |
| 3,096,740 | 7/1963 | Noorlander | 119/14.52 |
| 3,967,587 | 7/1976 | Noorlander | 119/14.49 |
| 3,973,521 | 8/1976 | Duncan | 119/14.47 |
| 4,059,070 | 11/1977 | Siddall et al. | 119/14.47 |
| 4,090,471 | 5/1978 | Thompson | 119/14.51 |
| 4,116,165 | 9/1978 | Arrington | 119/14.47 |
| 4,249,481 | 2/1981 | Adams | 119/14.02 |
| 4,263,912 | 4/1981 | Adams | 128/281 |
| 4,269,143 | 5/1981 | Erbach | 119/14.49 |
| 4,280,446 | 7/1981 | Noorlnder | 119/14.49 |
| 4,303,038 | 12/1981 | Thompson et al. | 119/14.36 |
| 4,315,480 | 2/1982 | Noorlander | 119/14.49 |
| 4,324,201 | 4/1982 | Larson | 119/14.51 |
| 4,332,215 | 6/1982 | Larson | 119/14.49 |
| 4,352,234 | 10/1982 | Noorlander | 29/450 |
| 4,425,872 | 1/1984 | Mills | 119/14.47 |
| 4,457,262 | 7/1984 | Mills | 119/14.47 |
| 4,459,938 | 7/1984 | Noorlander | 119/14.47 |
| 4,459,939 | 7/1984 | Noorlander | 119/14.49 |
| 4,530,307 | 7/1985 | Thompson | 119/14.49 |
| 4,572,106 | 2/1986 | Mills | 119/14.47 |
| 4,604,969 | 8/1986 | Larson | 119/14.36 |
| 4,610,220 | 9/1986 | Goldberg et al. | 119/14.47 |
| 4,651,676 | 3/1987 | Kupres | 119/14.47 |
| 4,745,881 | 5/1988 | Larson | 119/14.51 |
| 4,756,275 | 7/1988 | Larson | 119/14.49 |
| 4,869,205 | 9/1989 | Larson | 119/14.51 |
| 4,964,368 | 10/1990 | Ball et al. | 119/14.49 |
| 5,007,378 | 4/1991 | Larson | 119/14.47 |
| 5,069,162 | 12/1991 | Thompson et al. | 119/14.47 |
| 5,178,095 | 1/1993 | Mein | 119/14.47 |
| 5,224,442 | 7/1993 | Davies | 119/14.49 |
| 5,482,004 | 1/1996 | Chowdhury | 119/14.52 |
| 5,493,995 | 2/1996 | Chowdhury | 119/14.54 |
| 5,572,947 | 11/1996 | Larson et al. | 119/14.51 |
| 5,752,462 | 5/1998 | Petersson | 119/14.47 |
| 6,009,834 | * 1/2000 | Krone et al. | 119/14.47 |

* cited by examiner

*Primary Examiner*—Charles T. Jordan
*Assistant Examiner*—Elizabeth Shaw
(74) *Attorney, Agent, or Firm*—Andrus, Sceales, Starke & Sawall, LLP

(57) ABSTRACT

A modular teat cup assembly for use with a milking machine for milking cows. The modular teat cup assembly comprises a hollow tubular shell together with a cartridge assembly slidably received within the shell. The cartridge assembly includes a spool-shaped liner and a framework comprising a pair of opposing sleeve members for supporting the liner. The sleeve members are movable between an open position to permit removal and replacement of the liner, and a closed position for supporting the liner therebetween. A cap removably mounted on the bottom of the shell holds the cartridge assembly within the shell and is used to attach a milking tube in the conventional manner. A head piece includes a mouth for receiving a cow's teat, and is snapped onto the upper end of the shell to complete the modular assembly.

26 Claims, 2 Drawing Sheets

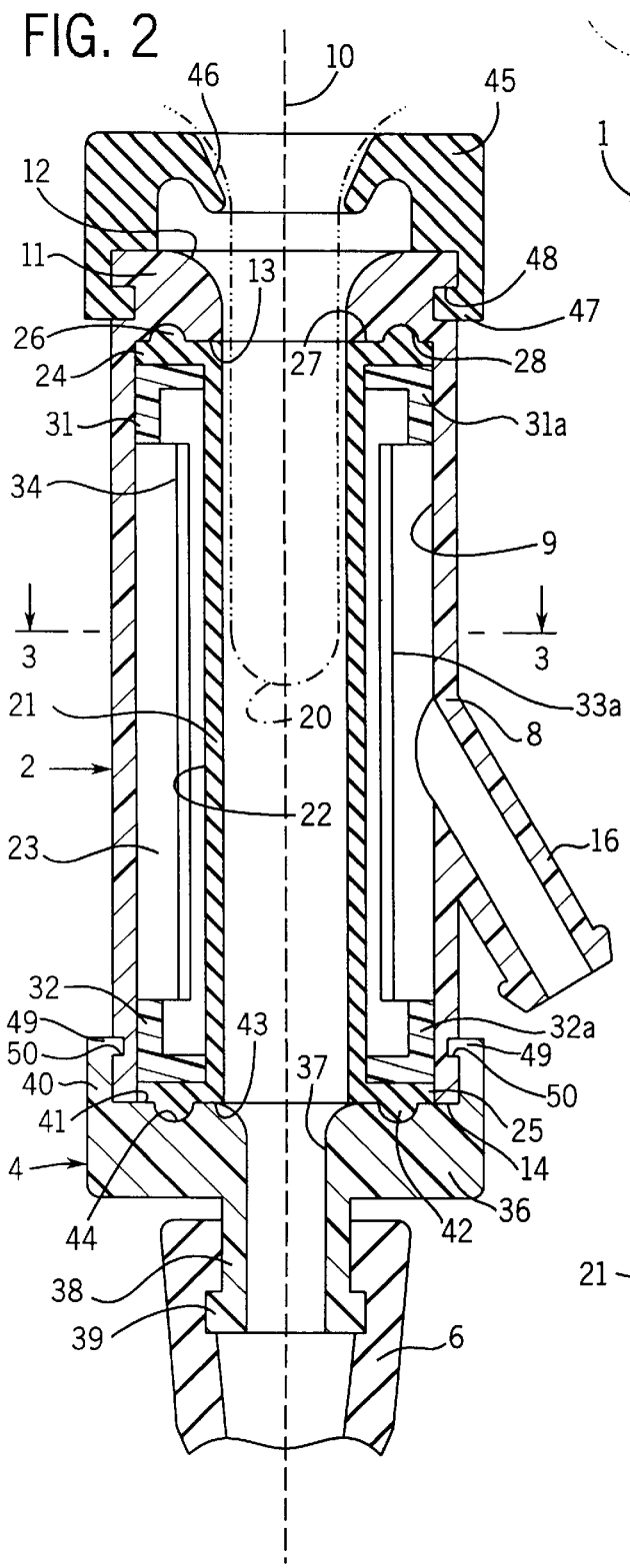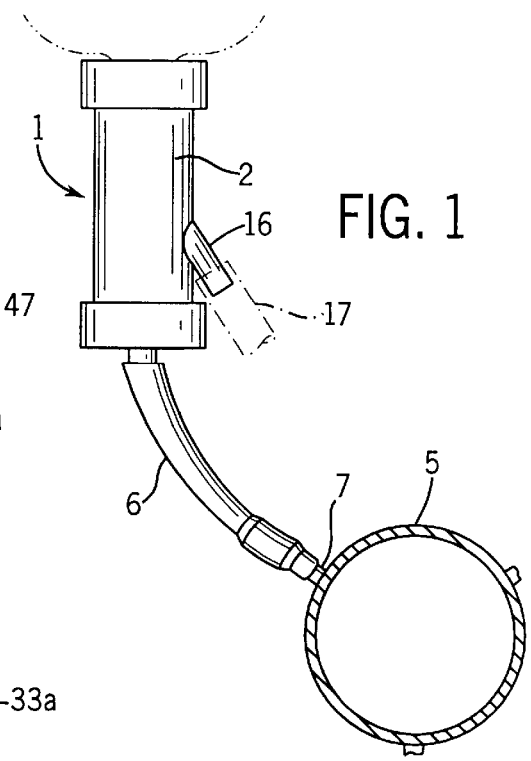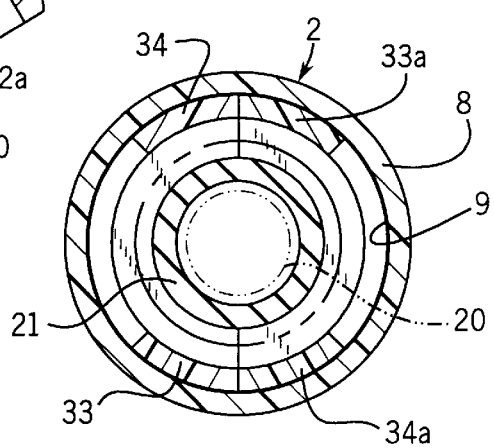

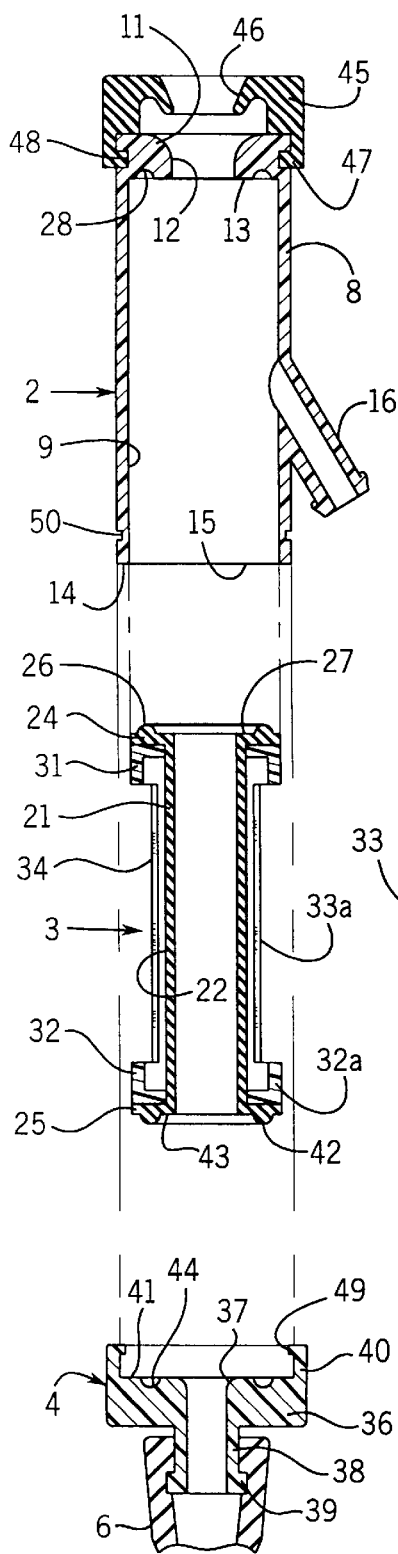
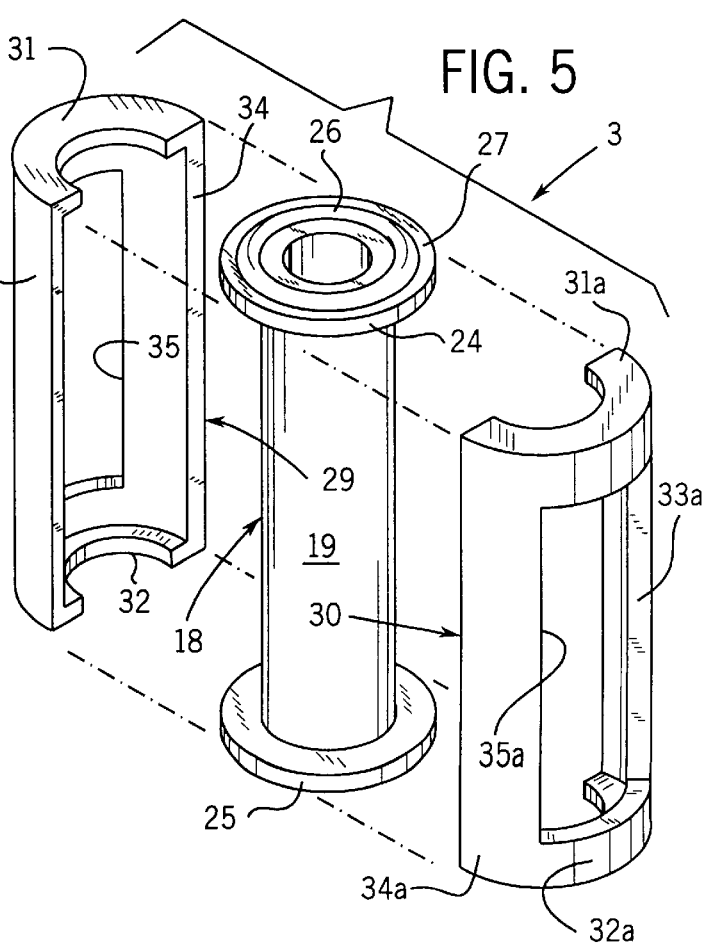
FIG. 4
FIG. 5

MODULAR TEAT CUP ASSEMBLY

BACKGROUND OF THE INVENTION

The present invention relates to teat cup assemblies for vacuum operated milking machines, and more particularly to a cartridge assembly enabling quick and easy replacement of a liner used in a teat cup assembly.

Conventional automatic milking machines utilize teat cup assemblies for milking cows. A typical teat cup assembly includes a hollow, rigid outer shell or cup adapted to be attached to a pulsating vacuum line, and an elongated, flexible, resilient, tubular inflation or liner which fits inside the shell and is coupled with a constant vacuum source. Typically, the inflation or liner includes an upper mouth, a barrel defining a teat-receiving region, and a milk tube section which extends downwardly out of the shell or cup and is attached to a milk claw for collecting milk. The upper mouth as well as the milk tube section are both sealingly engaged with the upper and lower ends of the shell, respectively, to form an annular vacuum chamber surrounding the barrel between the shell and the inflation. As previously noted, since the shell is attached to a pulsating vacuum line, the pressure in this annular chamber is alternated between subatmospheric pressure and atmospheric pressure. The constant vacuum applied to the lower milking tube section of the inflation draws milk from the cow's teat while at the same time the alternating pressure in the annular chamber periodically causes inward collapse of the barrel wall of the inflation or liner resulting in a massaging action on the teat. Also, the periodic collapse of the barrel intermittently relieves the teat from exposure to the constant vacuum applied to the interior of the inflation, and thus advantageously avoids complications such as inflammation of the teat as well as a tendency to induce mastitis.

Inflations or liners are typically composed of an elastomeric material due to the resilient nature of such material, i.e. its capability of recovering to its original size and shape after repeated deformation. Inflations or liners are most often made from a natural or synthetic rubber composition, e.g. silicone rubbers have been proposed and used in certain circumstances. Each of these materials have their own unique advantages and disadvantages. For example, natural or synthetic rubber compositions are more resistant to tearing or ripping, but are subject to attack by oils, butterfats, teat treatment preparations and other chemicals used in the milking process. On the other hand, silicone rubbers are substantially less vulnerable to attack by such chemicals, and thus, have relatively long useful life. However, silicone rubber tends to tear and puncture more easily than rubber.

If an inflation is ripped or torn, it must be replaced. Also, even if not ripped or torn, the inflation will eventually need to be replaced as it will deteriorate over time through continued use. In addition, under some circumstances, it would be an advantage to have the ability to replace an inflation made of a rubber composition with one made of silicone, or vice versa. Thus, it would be an advantage in the art to provide a teat cup assembly which enables the quick and easy replacement of the inflation.

SUMMARY OF THE INVENTION

A modular teat cup assembly for use with a milking machine for milking cows. The modular teat cup assembly comprises a shell including a hollow tubular body having an outer wall and an upper end with a radially inwardly extending upper rim defining an inlet and a lower end having an axially extending lower rim defining an outlet. A cartridge assembly is slidably received within the tubular body of the shell and is seated against the upper rim. The cartridge assembly includes a spool shaped liner and a framework for supporting the liner. The liner has a hollow tubular barrel with an upper flange at its upper end and a lower flange at its lower end. The barrel defines a teat-receiving region axially aligned with the inlet and having an outer wall spaced inwardly from the outer wall of the shell to define a vacuum chamber. The barrel of the liner is deformable between a relaxed profile and a collapsed massage profile around the teat of a cow. A cap removably mounted on the lower rim of the shell holds the cartridge assembly within the shell. The above modular teat cup assembly permits the cartridge assembly to be easily removed from the shell so that the framework supporting the liner can also be removed and the liner replaced with a new and/or different liner.

In a preferred form, the framework comprises a pair of opposing sleeve members movable between an open position to permit removal of the liner and a closed position for supporting the liner therebetween. Each sleeve member includes an upper collar portion for supporting the upper flange of the liner, a lower collar portion for supporting the lower flange of the liner, and axially extending rigid beam members interconnecting the upper and lower collar portions.

In another aspect, the present invention provides a liner for use in a teat cup assembly for milking cows. The liner includes a hollow tubular barrel having an upper end and a lower end, an upper flange extending radially outwardly from the upper end of the barrel, and a lower flange extending radially outwardly from the lower end of the barrel. Preferably, the barrel, upper flange and lower flange are integrally formed as one piece from an elastomeric material. Also, an upper seal between the upper flange and the upper rim of the tubular body of the shell is preferably formed by an annular bead projecting upwardly in an axial direction from the upper flange of the liner and a corresponding bead-receiving groove formed in an annular surface of the upper rim. A lower seal between the lower flange of the liner and the cap is preferably formed by an annular bead projecting downwardly in an axial direction from the lower flange of the liner and a corresponding bead-receiving groove formed in an annular surface of the cap. The upper and lower annular beads and their corresponding grooves also function to properly align the liner within the shell, and provide means for stabilizing the liner, especially during its contraction.

In yet another aspect, the present invention provides a cartridge assembly for use with a teat cup assembly for milking cows. The cartridge assembly includes a spool-shaped liner having a hollow tubular barrel with an upper flange at its upper end and a lower flange at its lower end, and a framework for supporting the liner. Preferably, the framework comprises a pair of opposing sleeve members having semi-circular shaped upper collar portions for supporting the upper flange of the liner, a semi-circular shaped lower collar portion for supporting the lower flange of the liner, and axially extending rigid means interconnecting the upper and lower collar portions. The sleeve members are moveable between an open position to prevent removal of the liner and a closed position for supporting the liner therebetween in the shell of the modular teat cup assembly. The cartridge is preferably loaded within the shell from the lower end or bottom of the shell.

The present invention thus provides a modular teat cup assembly wherein the liner may be easily and quickly removed from the shell for replacement with a new liner.

BRIEF DESCRIPTION OF THE SEVERAL VIEWS OF THE DRAWING

In the drawings:

FIG. 1 is a side elevational view of a modular teat cup assembly, partially in section, of the present invention shown connected at its upper end to a cow's teat and at its lower end to a claw of a milking machine;

FIG. 2 is an enlarged, cross-sectional view of the teat cup assembly illustrated in FIG. 1;

FIG. 3 is a sectional view taken along line 3—3 of FIG. 2 and illustrating the barrel of the liner in a relaxed profile;

FIG. 4 is an exploded view showing the components of the modular teat cup assembly in cross-section; and FIG. 5 is an exploded view of the cartridge assembly that is received within the shell of the modular teat cup assembly illustrating the liner and supporting sleeve members.

DETAILED DESCRIPTION OF THE INVENTION

Referring now to the drawings, there is illustrated a modular teat cup assembly generally designated by the numeral 1. Teat cup assembly 1 includes a rigid outer shell or cup 2, a cartridge assembly generally designated by the numeral 3, and a cap 4. As shown in FIG. 1, teat cup assembly 1 is connected to a claw 5 (shown fragmentarily) via a milking tube 6 which in turn is connected to an automatic milking machine (not shown). As is conventional, claw 5 is connected to a suitable constant vacuum system (not shown), and includes a plurality of nipples 7 (only one of which is shown in FIG. 1) to which milking tube 6 is connected.

Thus, milking tube 6 is connected to a constant vacuum source via milking claw 5, as is conventional.

The shell 2 may be formed from a metal such as stainless steel, or another suitable rigid material such as a synthetic thermoplastic or thermosetting resin. As shown best in FIG. 2, shell 2 is in the form of a hollow tubular body having an outer cylindrical wall 8 with an internal surface 9. The tubular body of shell 2 defines a longitudinal cylindrical passageway for receiving cartridge assembly 3, and thus defines a longitudinal axis 10. Shell 2 has an upper end having a radially inwardly extending annular upper rim 11 defining an inlet 12. Upper rim 11 includes an annular surface 13 extending perpendicular to longitudinal axis 10, and inlet 12 is tapered inwardly in an axial direction from outer wall 8 of shell 2 toward annular surface 13. Shell 2 also includes a lower end having an axially extending lower rim 14 defining an outlet 15 which is axially aligned with inlet 12. A nipple 16 is integrally formed with outer wall 8 of shell 2, and extends at an acute angle with respect to axis 10. Nipple 16 is connected, via suitable tubing 17 (shown in phantom in FIG. 1), to communicate with a pulsator which alternates between subatmospheric pressure and atmospheric pressure to alternately cause a liner 18 contained within cartridge assembly 3 to contract and expand for milking, as is conventional.

Cartridge assembly 3 is loaded within shell 2 from the lower end or bottom of shell 2 via outlet 15, i.e. is slidably received upwardly along axis 10 within the passageway formed by the interior of the tubular body of shell 2, and is seated against upper rim 11 of shell 2. The cartridge assembly 3 includes a spool-shaped liner 18 and a framework for supporting liner 18. Liner 18 is formed as a one-piece integrally molded unit from a flexible, resilient elastomeric material, preferably a synthetic or natural rubber composition or a silicone composition. As illustrated, liner 18 includes an elongated generally cylindrical, hollow tubular barrel 19 defining a teat-receiving region axially aligned with inlet 12. Barrel 19 has an inner diameter in its relaxed state which is dimensioned to be slightly greater than the outer diameter of a teat 20. Barrel 19 includes a cylindrical outer wall 21 having an exterior surface 22 spaced radially inwardly from internal surface 9 of shell 2 to define an annular vacuum chamber 23. Barrel 19 of liner 18 is composed of a resilient elastomeric material and is deformable between a relaxed profile, which is illustrated in FIG. 3, and a collapsed massage profile (not shown) around teat 20. As previously described, these profiles occur because the interior of liner 18 is subjected to a constant subatmospheric pressure while the vacuum chamber 23 is subjected to alternating pressure conditions resulting in periodic contracting and expanding of barrel wall 21, which in turn results in a massaging action on teat 20.

As illustrated, barrel 19 of liner 18 has an integral upper flange 24 extending radially outwardly from barrel 19 and perpendicular to longitudinal axis 10. Barrel 19 also includes a lower flange 25 extending radially outwardly from the lower end of barrel 19 and perpendicular to longitudinal axis 10. An upper seal between upper flange 24 of liner 18 and upper rim 11 of shell 2 provides an air-tight seal. The upper seal is formed by an annular bead 26 projecting upwardly in an axial direction from an upper annular surface 27 of upper flange 24, and a corresponding bead-receiving groove 28 formed in annular surface 13 of upper rim 11. As previously noted, bead 26 and groove 28 also stabilize and align liner 18 within shell 2.

The framework for supporting liner 18 is best shown in FIGS. 4 and 5. More specifically, the framework includes a pair of opposed identical sleeve members 29 and 30 movable between an open position (shown in FIG. 5) to permit removal of liner 18 therefrom and a closed position (shown in FIG. 4) for supporting liner 18 therebetween. Since sleeve members 29 and 30 are identical, only sleeve member 29 will be described herein. However, like parts with respect to sleeve member 30 will be designated by the same numeral in the drawing followed by the letter "a". Sleeve member 29 includes a semi-circular shaped upper collar portion 31 for supporting upper flange 24 of liner 18, together with a semi-circular shaped lower collar portion 32 for supporting lower flange 25 of liner 18. Collar portions 31 and 32 are interconnected by rigid beam members 33 and 34. An opening or slot 35 is formed between collar portions 31 and 32 and beam members 33 and 34 so that the pulsating vacuum in vacuum chamber 23 may be communicated with the exterior surface 22 of barrel 19 to permit deformation thereof, as previously described. Sleeve member 29 is dimensioned to have a length substantially identical to the length of barrel 19 (as shown best in FIG. 2) so that collar portions 31 and 32 support upper flange 24 and lower flange 25 of liner 18. Also, each sleeve member 29 and 30 is illustrated as being semi-circular in shape. However, the supporting framework for liner 18 could also be constructed in three pieces, four pieces or another multi-piece unit thus resulting in a corresponding change in shape for both the sleeve members and their collar portions.

Cap 4 is removably mounted on lower rim 14 of shell 2 for holding cartridge assembly 3 within shell 2. For this purpose, cap 4 includes an annular body 36 defining a central passageway 37 axially aligned with inlet 12, outlet 15 and longitudinal axis 10. An integral tubular stem 38 depends from body 36, and includes an annular boss 39 at the open lower end of passageway 37 for mounting milking tube 6 thereon. An annular axially extending rim 40 is dimensioned to have an inner diameter substantially identical to the outer diameter of shell 2. Cap 4 is composed of a polymeric material, and includes a radially inwardly projecting lip 49 which engages an annular groove 50 formed in the outer surface of shell 2 to hold or lock liner 18 and sleeve members 29 and 30 within shell 2. Cap 4 also includes an annular surface 41 extending perpendicular to longitudinal axis 10 which together with rim 40 forms a recess for receiving lower rim 14 of shell 2 as well as lower flange 25 of liner 18. As shown best in FIG. 2, a lower seal between lower flange 25 of liner 18 and cap 4 provides an air-tight seal. The lower seal is formed by an annular bead 42 projecting axially downwardly from an annular surface 43 of lower flange 25 of liner 18 and a corresponding annular bead receiving groove 44 formed in annular surface 41 of cap 4. As previously noted, bead 42 and groove 44 also stabilize and align liner 18 within shell 2. Thus, when the lower end of shell 2 is seated within cap 4 against surface 41, an air-tight seal is provided by the described upper and lower seals to isolate the pulsating pressure occurring within vacuum chamber 23 from the constant vacuum applied to the interior of barrel 19 of liner 18.

As best shown in FIG. 2, a head portion 45 is annular in shape, and includes a mouth 46 for receiving the cow's teat 20. The diameter of mouth 46 is dimensioned to be slightly small than the diameter of barrel 19, as best shown in FIG. 2, so as to aid in holding teat cup assembly 1 on teat 20 (shown in phantom lines in FIG. 2) of a cow. Head portion 45 is typically composed of an elastomeric material and includes a radially inwardly projecting rim 47 which engages an annular groove 48 formed in the outer surface of upper rim 11 of shell 2 to be held in place, and thus enabling the modular teat cup assembly 1 to be properly held with respect to teat 20.

It should be noted that the terms "inflation" and "liner" are sometimes used interchangeably in the trade. As used herein, the term "liner" and/or "inflation" is intended to mean barrel 19 together with integral flanges 24 and 25.

In order to assemble modular teat cup assembly 1, liner 18 is placed or inserted within sleeve members 29 and 30 and sleeve members 29 and 30 are then closed to form cartridge assembly 3. Thereafter, cartridge assembly 3 is loaded into shell 2 via its lower or bottom outlet 15 until annular bead 26 of upper flange 24 is received within groove 28 of upper rim 11 so that cartridge assembly 3 is seated within shell 2. Thereafter, cap 4 is forced over lower rim 14 until lip 49 locks in groove 50 and bead 42 is received within groove 44. Head portion 45 is then snapped in place on the upper end of shell 2. Finally, the upper end of milking tube 6 is forced over boss 39 of stem 38 of cap 4, and the lower end of milking tube 6 is forced over a nipple 7 of claw 5.

What is claimed is:

1. A modular teat cup assembly for use with a milking machine for milking cows, comprising:
   a shell including a hollow tubular body having an outer wall and defining a longitudinal axis, said tubular body further including an upper end having a radially inwardly extending upper rim defining an inlet and a lower end having an axially extending lower rim defining an outlet;
   a cartridge assembly slidably received within the tubular body of said shell and seated against said upper rim, said cartridge assembly including a spool-shaped liner and a framework for supporting said liner, said liner having a hollow tubular barrel with an upper end and a lower end, an upper flange at said upper end and a lower flange at said lower end, said barrel defining a teat-receiving region axially aligned with said inlet and having an outer wall spaced inwardly from the outer wall of said shell to define a vacuum chamber, said barrel deformable between a relaxed profile and a collapsed massage profile; and
   a cap removably mounted on the lower rim of said shell for holding said cartridge assembly within said shell.

2. The modular teat cup assembly of claim 1 wherein said upper rim includes an annular surface extending perpendicular to said longitudinal axis.

3. The modular teat cup assembly of claim 2 wherein said inlet is tapered inwardly in an axial direction from the outer wall of said shell toward said annular surface.

4. The modular teat cup assembly of claim 1 further including an upper seal between the upper flange of said liner and the upper rim of said shell.

5. The modular teat cup assembly of claim 4 wherein said upper rim includes an annular surface, and the upper seal comprises an annular bead projecting axially upwardly from the upper flange of said liner and a corresponding bead-receiving groove formed in the annular surface of said upper rim.

6. The modular teat cup assembly of claim 1 further including a lower seal between the lower flange of said liner and said cap.

7. The modular teat cup assembly of claim 6 wherein said cap includes an annular surface, and said lower seal comprises an annular bead projecting axially downwardly from the lower flange of said liner and a corresponding bead-receiving groove formed in the annular surface of said cap.

8. The modular teat cup assembly of claim 1 wherein said framework comprises a pair of opposing sleeve members movable between an open position to permit removal of said liner therefrom and a closed position for supporting said liner therebetween.

9. The modular teat cup assembly of claim 8 wherein each sleeve member includes an upper collar portion for supporting the upper flange of said liner, a lower collar portion for supporting the lower flange of said liner, and axially extending rigid means interconnecting said upper and lower collar portions.

10. The modular teat cup assembly of claim 9 wherein each collar portion is semi-circular in shape.

11. A liner for use in a teat cup assembly for milking cows, comprising:
    a hollow tubular barrel having an upper end and a lower end, said barrel defining a longitudinal axis;
    an upper flange extending radially outwardly from the upper end of said barrel, said upper flange includes an upper annular surface, and an annular bead projecting upwardly in an axial direction from said upper surface; and
    a lower flange extending radially outwardly from the lower end of said barrel.

12. The liner of claim 11 wherein said upper flange extends perpendicular to said longitudinal axis.

13. The liner of claim 11 wherein said lower flange extends perpendicular to said longitudinal axis.

14. The liner of claim 11 wherein said barrel, upper flange and lower flange are integrally formed as one piece from an elastomeric material.

15. A cartridge assembly for use with a teat cup assembly for milking cows, comprising:
    a spool-shaped liner having a hollow tubular barrel with an upper flange at its upper end and a lower flange at its lower end, said barrel defining a teat-receiving region and being deformable between a relaxed profile and a collapsed massage profile; and a framework for supporting said liner, said framework comprises a pair of opposing sleeve members movable between an open position to permit removal of said liner therefrom and a closed position for supporting said liner therebetween.

16. The cartridge assembly of claim 15 wherein each sleeve member includes an upper collar portion for supporting the upper flange of said liner, a lower collar portion for supporting the lower flange of said liner, and axially extending rigid means interconnecting said upper and lower collar portions.

17. The cartridge assembly of claim 16 wherein each collar portion is semi-circular in shape.

18. A liner for use in a teat cup assembly for milking cows, comprising:

a hollow tubular barrel having an upper end and a lower end, said barrel defining a longitudinal axis;

an upper flange extending radially outwardly from the upper end of said barrel; and a lower flange extending radially outwardly from the lower end of said barrel, said lower flange includes a lower annular surface, and an annular bead projecting downwardly in an axial direction from said lower surface.

19. The liner of claim 18 wherein said upper flange extends perpendicular to said longitudinal axis.

20. The liner of claim 18 wherein said lower flange extends perpendicular to said longitudinal axis.

21. The liner of claim 18 wherein said barrel, upper flange and lower flange are integrally formed as one piece from an elastomeric material.

22. A cartridge assembly for use with a teat cup assembly for milking cows, comprising:

a spool-shaped liner having a hollow tubular barrel with an upper flange at its upper end and a lower flange at its lower end, said barrel defining a teat-receiving region and being deformable between a relaxed profile and a collapsed massage profile; and a framework for supporting said liner, said framework comprises plural sleeve members movable between an open position to permit removal of said liner therefrom and a closed position for supporting said liner therebetween.

23. The cartridge assembly of claim 22 wherein each sleeve member includes an upper collar portion for supporting the upper flange of said liner, a lower collar portion for supporting the lower flange of said liner, and axially extending rigid means interconnecting said upper and lower collar portions.

24. The cartridge assembly of claim 23 wherein each collar portion is arcuate in shape.

25. A cartridge assembly for use with a teat cup assembly for milking cows, comprising:

a spool-shaped liner having a hollow tubular barrel with an upper flange at its upper end and a lower flange at its lower end, one of said flanges having an annular surface with an annular bead projecting outwardly in an axial direction from said annular surface, and said barrel defining a longitudinal axis and a teat-receiving region and being deformable between a relaxed profile and a collapsed massage profile; and a framework for supporting said liner, said framework comprises a cylindrical sleeve member surrounding said liner, said sleeve member includes an upper collar portion for supporting the upper flange of said liner, a lower collar portion for supporting the lower flange of said liner, and axially extending rigid means interconnecting said upper and lower collar portions.

26. The cartridge assembly of claim 25 wherein each collar portion is circular in shape.

* * * * *